(12) United States Patent
Bashore et al.

(10) Patent No.: US 9,399,263 B2
(45) Date of Patent: Jul. 26, 2016

(54) PORTABLE BATTERY POWERED WELDER (75) Inventors: Brian S. Bashore, Tipp City, OH (US);
Darrell L. Sickels, Troy, OH (US);
Bernard J. Vogel, Troy, OH (US); Caleb R. Krisher, Appleton, WI (US)

(73) Assignee: HOBART BROTHERS COMPANY, Troy, OH (US)

(*) Notice: Subject to any disclaimer, the term of this patent is extended or adjusted under 35 U.S.C. 154(b) by 2424 days.

(21) Appl. No.: 11/848,874

(22) Filed: Aug. 31, 2007

(65) Prior Publication Data
US 2009/0057285 A1 Mar. 5, 2009

(51) Int. Cl.
B23K 9/10 (2006.01)
B23K 9/28 (2006.01)
B23K 9/32 (2006.01)

(52) U.S. Cl.
CPC *B23K 9/32* (2013.01); *B23K 9/1006* (2013.01)

(58) Field of Classification Search
CPC ............ B23K 9/32–9/325; B23K 9/12–9/121; B23K 9/1006
USPC ....... 219/130.1, 137.2, 137.31, 137.7, 137 PS
See application file for complete search history.

(56) References Cited

U.S. PATENT DOCUMENTS

| | | | | |
|---|---|---|---|---|
| 1,354,211 | A * | 9/1920 | Reed | 206/38 |
| D148,188 | S | 12/1947 | Robert | |
| 2,833,912 | A | 5/1958 | Royer | |
| 3,309,497 | A * | 3/1967 | Kensrue | 219/137.9 |
| 3,322,299 | A * | 5/1967 | Foster | B65D 43/021 220/789 |
| 3,417,897 | A * | 12/1968 | Johnson | B65D 43/161 220/254.3 |
| 3,480,221 | A | 11/1969 | Sekino | |
| 3,582,606 | A * | 6/1971 | Henriksen et al. | 219/137.7 |
| 4,034,885 | A * | 7/1977 | Hunckler | B65D 43/163 220/23.8 |
| 4,182,949 | A | 1/1980 | Powers | |
| 4,465,920 | A | 8/1984 | Hoyt et al. | |
| 4,508,954 | A | 4/1985 | Kroll | |

(Continued)

FOREIGN PATENT DOCUMENTS

DE 2811940 9/1979
DE 19855033 5/2000

(Continued)

OTHER PUBLICATIONS

Millermatic Passport and M-10 Gun; Owner's Manual; OM-1328 220 073U; Miller.

(Continued)

*Primary Examiner* — Sang Y Paik
(74) *Attorney, Agent, or Firm* — Fletcher Yoder P.C.

(57) ABSTRACT

A portable battery powered welder is disclosed that is configured to operate without an external power source. The portable battery powered welder may include a battery coupled to a welding circuit and a wire feeder. Further, the portable battery powered welder may include a suitcase to integrally support and completely enclose the welding circuit, the battery, and the wire feeder. The suitcase may include a lateral access door having a hinge and a latch. Additionally, the wire feeder and a wire spool may be disposed in a region accessible by the lateral access door. The suitcase may also include an access panel disposed over a region containing the battery. The access panel may be mounted to the case via a snap mount and/or secured via fasteners. Finally, the suitcase may include a top handle and may be made of a lightweight, impact resistant, and flame retardant material.

26 Claims, 9 Drawing Sheets

(56) References Cited

U.S. PATENT DOCUMENTS

| | | | |
|---|---|---|---|
| 4,640,435 A * | 2/1987 | Dutt ........................ | B65D 1/16 220/782 |
| D294,080 S | 2/1988 | Golia et al. | |
| 4,815,596 A | 3/1989 | Reid | |
| 4,911,296 A * | 3/1990 | Hart, Jr. ...................... | 206/373 |
| D333,484 S | 2/1993 | Neumeister | |
| 5,222,683 A | 6/1993 | Blackshire | |
| D337,657 S | 7/1993 | March et al. | |
| D342,159 S | 12/1993 | Daouk | |
| 5,307,979 A | 5/1994 | Kim | |
| D357,263 S | 4/1995 | Soderholm | |
| 5,403,133 A | 4/1995 | Kim | |
| 5,599,470 A * | 2/1997 | Peotter et al. ................. | 219/133 |
| D386,148 S | 11/1997 | Katooka et al. | |
| 5,734,148 A | 3/1998 | Latvis et al. | |
| D415,614 S | 10/1999 | Akaike et al. | |
| D416,030 S | 11/1999 | Weller et al. | |
| 6,225,596 B1 | 5/2001 | Chandler et al. | |
| 6,243,913 B1 * | 6/2001 | Frank et al. ..................... | 15/320 |
| D454,578 S | 3/2002 | Ambruster et al. | |
| D462,519 S | 9/2002 | Gaydos et al. | |
| 6,479,795 B1 * | 11/2002 | Albrecht et al. ........... | 219/137.2 |
| D467,257 S | 12/2002 | Andersson et al. | |
| D467,425 S | 12/2002 | Hardigg et al. | |
| D472,384 S | 4/2003 | Richardson | |
| 6,818,860 B1 | 11/2004 | Stava | |
| 6,855,914 B1 | 2/2005 | Kaufman | |
| 6,888,099 B1 | 5/2005 | Schneider | |
| 6,977,358 B2 | 12/2005 | Albrecht | |
| 7,023,101 B2 | 4/2006 | Wang | |
| D520,237 S | 5/2006 | Cheng | |
| D523,242 S | 6/2006 | Hardigg et al. | |
| 7,183,157 B2 | 2/2007 | Yoo | |
| 7,208,699 B2 | 4/2007 | Stanzel | |
| 7,642,487 B2 | 1/2010 | Silvestro | |
| D611,074 S | 3/2010 | Bashore | |
| 2003/0052109 A1 | 3/2003 | Hayes | |
| 2004/0015258 A1 | 1/2004 | Hayes | |
| 2004/0178183 A1 * | 9/2004 | Cigelske, Jr. .............. | 219/130.1 |
| 2005/0000946 A1 | 1/2005 | Albrecht | |
| 2005/0001697 A1 | 1/2005 | Reynolds | |
| 2005/0067396 A1 | 3/2005 | Kaufman | |
| 2005/0252889 A1 * | 11/2005 | Stanzel et al. ................. | 219/74 |
| 2006/0027546 A1 | 2/2006 | Reynolds | |
| 2006/0027547 A1 | 2/2006 | Silvestro | |
| 2006/0076335 A1 | 4/2006 | Reynolds et al. | |
| 2006/0169685 A1 | 8/2006 | Stanzel | |
| 2006/0201923 A1 | 9/2006 | Hutchison | |
| 2006/0207981 A1 | 9/2006 | Diekmann | |
| 2007/0108174 A1 | 5/2007 | Narayanan et al. | |
| 2007/0135779 A1 * | 6/2007 | Lalomia et al. ............... | 604/319 |
| 2007/0158313 A1 | 7/2007 | Stanzel | |
| 2007/0181547 A1 * | 8/2007 | Vogel et al. ................. | 219/130.1 |
| 2007/0251931 A1 * | 11/2007 | Lambirth et al. .......... | 219/130.1 |
| 2007/0257084 A1 * | 11/2007 | Carrier et al. ................ | 228/44.3 |
| 2008/0047522 A1 | 2/2008 | Leisner et al. | |
| 2008/0073330 A1 | 3/2008 | Diedrick | |
| 2008/0083709 A1 * | 4/2008 | Shipulski ................... | 219/121.5 |
| 2008/0149611 A1 | 6/2008 | Roth | |
| 2008/0156783 A1 | 7/2008 | Vanden Heuel | |
| 2010/0051595 A1 | 3/2010 | Diedrick | |
| 2010/0051596 A1 | 3/2010 | Diedrick | |

FOREIGN PATENT DOCUMENTS

| | | |
|---|---|---|
| GB | 2264924 | 9/1993 |
| WO | 0076709 | 12/2000 |
| WO | 2005107993 | 11/2005 |

OTHER PUBLICATIONS

Millermatice Passport and M-10 Gun; Owner's Manual; OM-1328 220 073L; Miller.

Miller Electric Mfg Co.; Millermatic 140; www.MillerWelds.com; Issued Sep. 2006, Index No. DC/12.43.

Miller Electric Mfg Co.; SuitCase 8RC and 12RC; www.MillerWelds.com; Issued Jan. 2007, Index No. M/6.5.

Miller Electric Mfg Co.; Millermatic Passport; www.MillerWelds.com; Issued Feb. 2007, Index No. DC/12.53.

Glenn R "Broco Inc.'s GOWELDO; Portable Mig Welder" Jul. 1, 2003. Internet document downloaded from http://www.off-road.com/ on Sep. 23, 2008. Paragraph 4, Photographs 1, 2, 3.

U.S. Appl. No. 29/284,167, filed Aug. 31, 2007, Bashore et al.

* cited by examiner

PORTABLE BATTERY POWERED WELDER

BACKGROUND

The invention generally relates to portable welding systems. More specifically, embodiments of the invention relate to a portable battery powered welder having various welding components integrally mounted in a suitcase.

Portable welding systems may be used in field applications where it is not practical or convenient to send a work piece to a welding shop for repair or fabrication. One specific group of portable welders are designed for light welding applications (low output requirements of about 200 amps or less), and are well suited for shops and garages where only single-phase power is available. These welders find applications in the farming and ranching industry; off-road applications; food and beverage industry; restaurant and kitchen repair; petroleum and chemical fabrication; shipboard installation and repair; and many other maintenance and repair applications.

Unfortunately, these portable welding systems still require an external power source (e.g., single phase power) to provide the weld output power. This external power source may not be available in remote locations. For example, off-road enthusiasts may use a portable welding system at locations where a suitable power supply is simply not available (e.g., out on the trail). In addition, the current portable systems are not configured to handle the rugged conditions encountered during transport, such as during off-road driving.

BRIEF DESCRIPTION

Embodiments of the present invention provide a portable battery powered welder. The portable battery powered welder may include a battery coupled to a welding circuit and a wire feeder. Further, the portable battery powered welder may include a suitcase to integrally support and completely enclose the welding circuit, the battery, and the wire feeder. The suitcase may include a lateral access door having a hinge and a latch. Additionally, the wire feeder and a wire spool that includes consumable welding wire may be disposed in a region accessible by the lateral access door. The suitcase may also include an access panel disposed over a region containing the battery. The access panel may be mounted to the case via a snap mount and/or secured via fasteners. Finally, the suitcase may include a top handle and may be made of a lightweight, impact resistant, and flame retardant material, such as a polymer.

Certain embodiment of the battery powered welder may also include a power conversion and/or conditioning circuit that may be disposed in the suitcase and coupled to the battery. Further, a cooling system may be disposed in the suitcase for dissipating heat from the welding circuit, power conversion circuit, and/or conditioning circuit. The cooling system may include a wind tunnel, a front louver, a rear louver, and a fan that are disposed inside the suitcase or form a part of the enclosure. Finally, a work clamp and a welding gun may be coupled to the wire feeder and the welding circuit.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention provide a rugged and portable welding system that is configured to operate without an external power source. Specifically, embodiments of the present invention enable a suitcase to support and completely enclose a plurality of welding or system components that may be used to perform a welding operation. The suitcase provides a portable enclosure that protects the welding components which are disposed within the shell of the suitcase or are generally flush with an exterior of the suitcase. The suitcase further provides structural ribs and recesses to protect the system components that are generally flush with the exterior of the suitcase. Additionally, the suitcase includes external features for securing the suitcase during transport, such as a handle and other features configured to interface tie-down ropes or cords. All of these features provide the benefit of facilitating transport of the portable battery powered welder. Moreover, embodiments of the portable welding system increase reliability because the system components are protected and supported by the suitcase. In other word, the likelihood of damaging a system component is greatly reduced because the components are not protruding from the exterior of the suitcase.

In addition to housing welding components, the suitcase is also configured to house a battery to provide power for the welding operation. This has the benefit of enabling an operator to perform a welding operation in a remote location where an external power source may not be available. Further, the suitcase may include a weld circuit, a wire feeder, and a cooling system to facilitate the welding operation. Finally, the system may include a battery charging circuit to enable an operator to recharge the batteries located in the case. The illustrated suitcase includes hinged access doors and panels integrated into the external shell of the case that provide quick access to the welding and system components. This has the benefit of facilitating both the welding operation and the maintenance and repair of the system or welding components.

Figure 1:
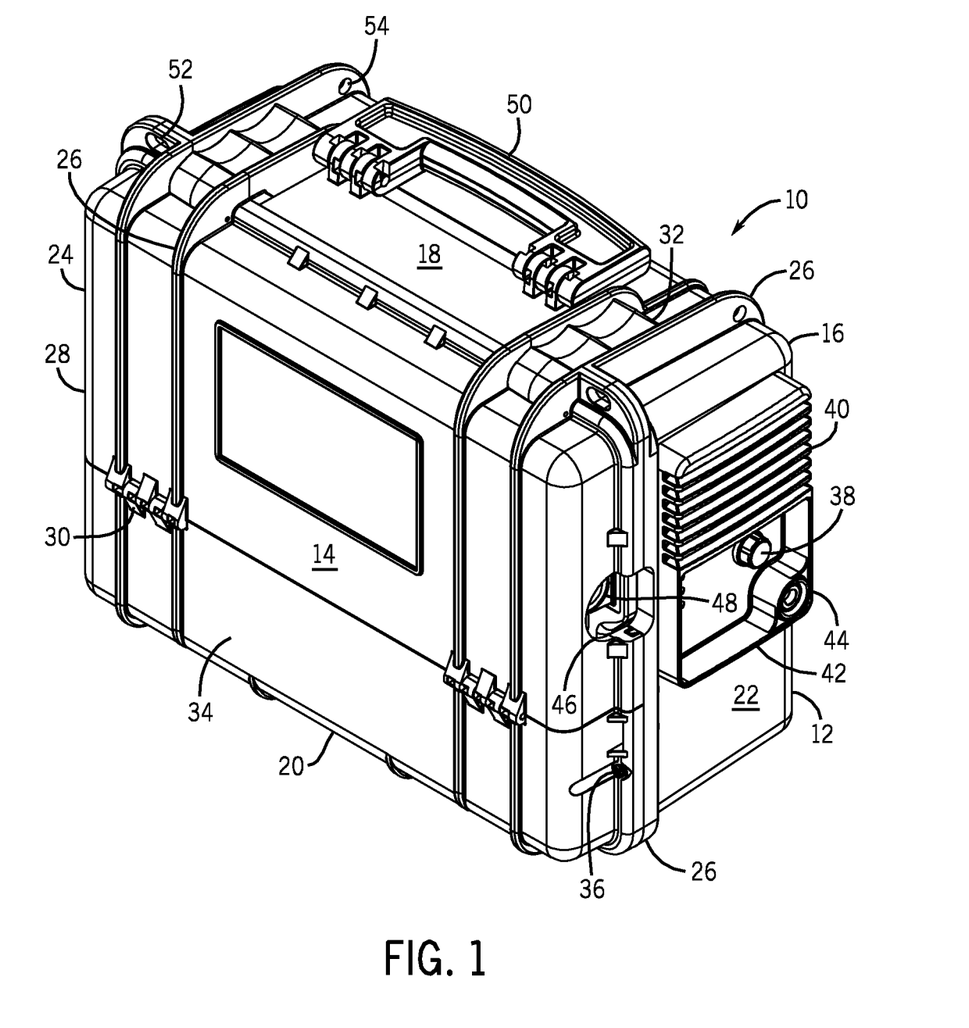
FIG. 1 is a perspective view of an embodiment of a portable battery powered welder in accordance with embodiments of the invention, illustrating a hinged lateral access door and an access panel that form part of the portable enclosure of the portable battery powered welder.

Turning now to the drawings and referring first to FIG. 1, an embodiment of a portable battery powered welder is illustrated and designated generally by reference numeral 10. Portable battery powered welder 10 includes a case, suitcase, portable enclosure, or shell 12 having a front side 14, back side 16, top side 18, bottom side 20, right side 22, and a left side 24. The suitcase 12 may be made from a light weight, impact resistant, and flame retardant material, for example, a polymer. The case is not limited to this type of material and may also be made, in whole or in part, from other structural materials, such as metal alloys or composite material. Further, the suitcase 12 may include structural ribs 26 to reinforce the case and provide protection to external features incorporated into the case 12. Additionally, the structural rib 26 may be used to secure the case during transport. For example, the structural ribs 26 provide upsets for securing ropes or cords about. These upsets enable the cords to provide both a downward force on the case and also support side loads to the case via the shoulders provided by the structural ribs 26.

The suitcase 12 may also include a lateral access door 28 that includes a hinge 30. The hinge 30 enables the lateral access door 28 to rotate between an open and a closed position over a first compartment that includes a wire feeder and a wire spool. The lateral access door 28 further includes a pair of latches 32 to secure the door in place. Additionally, the hinge 30 may be configured to enable the lateral access door 28 to be completely disengaged and removed from the body of the case 12. The suitcase 12 may include an access panel 34 that is snap-mounted and/or secured to the body of the case 12 via fasteners 36. The access panel 34 may be configured to open and close over a second compartment that includes at least one battery.

In certain embodiments, an external control panel 38 may also be included on the right side 22 of the suitcase 12. The external control panel 38 generally provides an interface to the battery powered welding circuit to enable an operator to control the welding process. Additionally, a front louver 40 may be integrated into the suitcase 12 and positioned on the right side 22 of the case 12. The front louver 40 is part of a cooling system that may be incorporated into the battery powered welder 10 to dissipate heat from the electronics.

FIG. 1 further illustrates one embodiment of a structural rib 42 that provides protection for the controls and other input devices located on the external control panel 38. A work cable connection 44 may also be located on the front right side 22 of the suitcase 12. Further, a welding wire outlet 46 and welding gun connection point 48 may also be located on the front ride side 22 of the suitcase 12. The work cable connection 44 enables an operator to couple a work cable and clamp to the portable battery welder 10. Likewise, the welding wire outlet 46 and welding gun connection point 48 enables an operator to couple a welding gun to the portable battery powered welder 10. Further, connection points 44 and 48 enable a closed-loop circuit between a work piece and the portable battery powered welder 10 to perform a welding operation. The portable battery powered welder 10 may be configured for multiple welding operations, such as Flux Cored Arc Welding (FCAW), Gas Metal Arc Welding (MIG), or Shielded Metal Arc Welding (Stick Electrode). Finally, the work clamp connection 44, welding wire outlet 46, and welding gun connection point 48 are generally flush with the exterior of the suitcase 12 and may be protected by structural ribs 26 and 42.

Suitcase 12 may also include a plurality of features to facilitate transport of the portable battery powered welder 10. The suitcase 12 may include a handle 50 that is large enough for single hand transport of the welder 10. Further, the handle 50 may be rotatably coupled to the suitcase 12 and rotated flush with the case 12 when not used by the operator. Further, the structural ribs 26 may include features to secure the battery powered welder 10 to a vehicle or other structure during transport. For example, the suitcase 12 may include one or more locking and/or tie-down features 52 (e.g., a pair of lock receptacles) located in or on the structural ribs 26 as illustrated in FIG. 1. The locking feature 52 may provide redundancy for latch 32 by ensuring the lateral access door 28 does not open even if the latch 32 is disengaged. The redundancy may be achieved by securing a padlock or other securing mechanism through locking feature 52. The feature 52 may also be used to secure the portable battery powered welder 10 in place during transport. For example, a hook on the end of a bungee cord could engage securing feature 52 to secure the case 12. Additionally, as will be discussed in more detail below, structural ribs 26 may include securing feature 54 (e.g., a pair of receptacles) to mount an accessory bag to the case 12.

Figure 2:
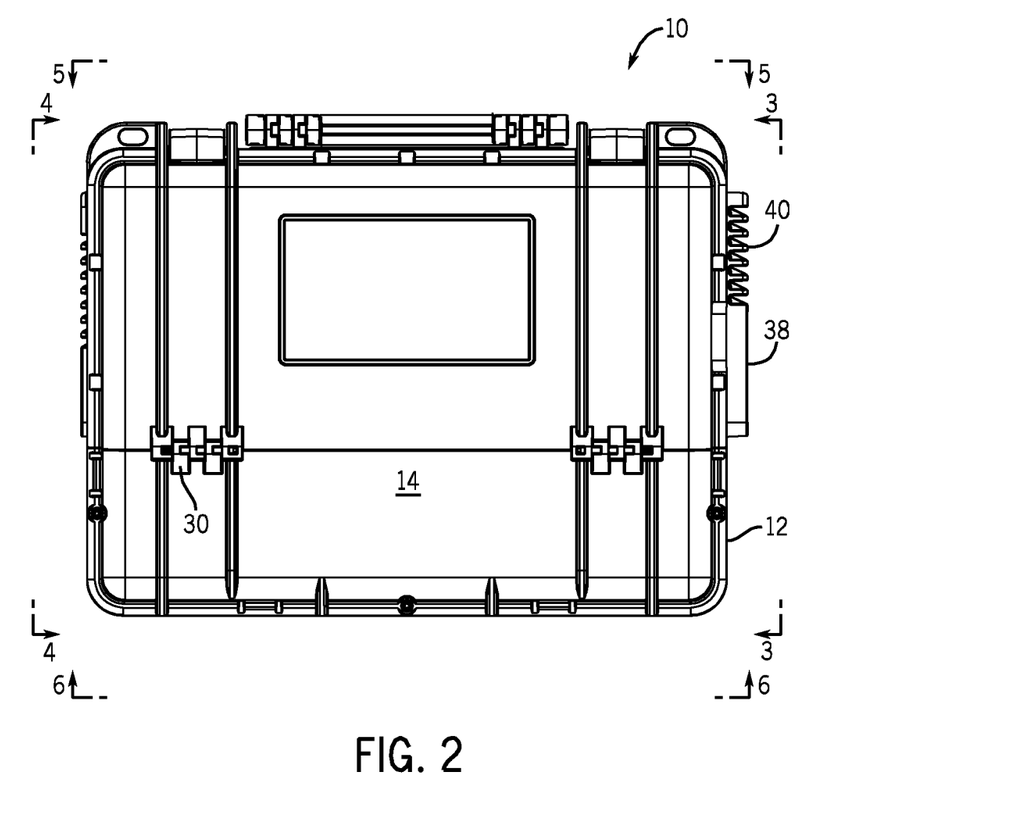
FIG. 2 is a front elevational view of an embodiment of the portable battery powered welder of FIG. 1.

FIG. 2 is a front elevational view of the portable battery powered welder 10 of FIG. 1. The figure illustrates the front side 14 of the case 12 and will be generally referenced to orient the views of FIGS. 3-6. Additionally, FIG. 2 illustrates that all of the system components of the battery powered welder 10 are either flush with the suitcase 12 and/or completely enclosed within the case 12. In other words, in the illustrated embodiment, none of the components are protruding from the exterior of the case 12.

Figure 3:
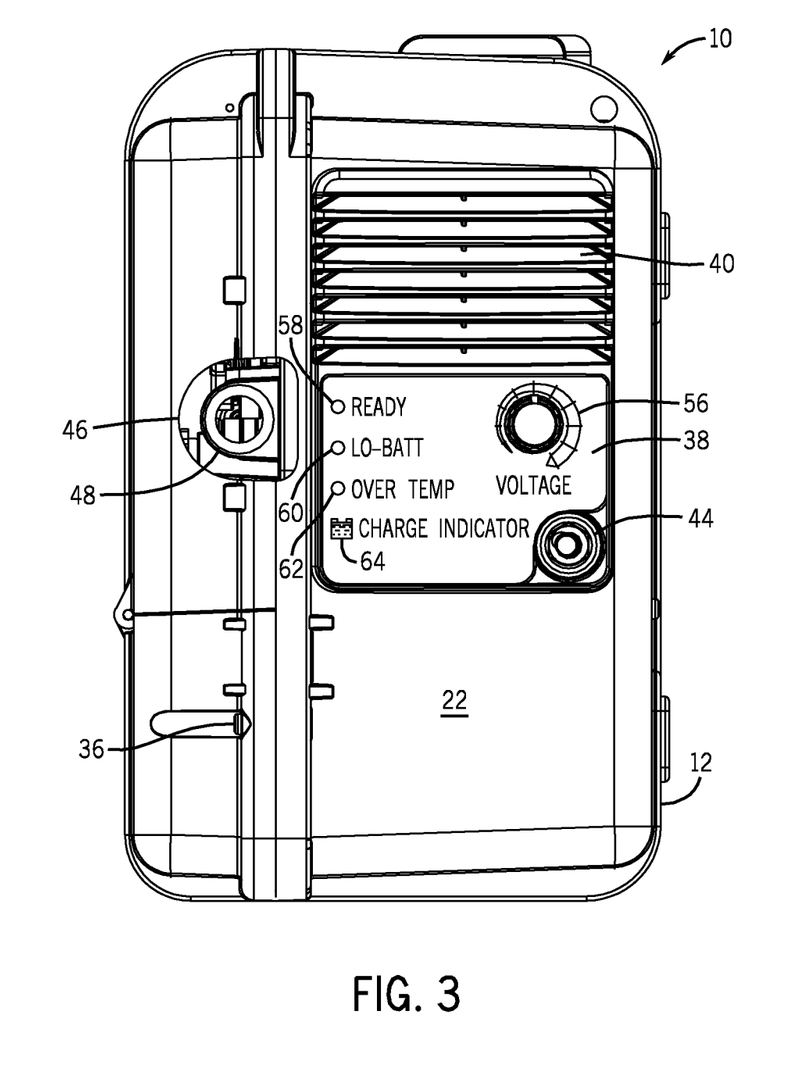
FIG. 3 is a right side elevational view of an embodiment of the portable battery powered welder of FIG. 2, viewed along line 3-3, illustrating an external control panel, front louver, and welding wire outlet.

FIG. 3 is a right side elevational view of the portable battery powered welder of FIG. 2, viewed along line 3-3. The figure illustrates the front louver 40, work cable connection 44, welding wire outlet 46, and welding gun connection point 48 when viewed from the right side of the suitcase 12. The figure also illustrates features and controls that may be included in the external control panel 38. For example, external control panel 38 may include an output control 56 along with a number of other indicators. The output control 56 may enable an operator to control the voltage, wire speed, and/or power used during the welding operation. This enables an operator to use the portable battery powered welder 10 for a number of different welding applications.

Other indicators provided on the external control panel 38 may include a ready indicator 58, a low battery indicator 60, an over temperature indicator 62, and a battery charge indicator 64. These indicators facilitate the operation of the portable battery powered welder 10. For example, the ready indicator may communicate to an operator that the portable battery powered welder 10 is capable of providing the power needed for the welding operation. Similarly, the low battery indicator 60 may communicate to an operator that the portable battery powered welder 10 is not capable of supplying the necessary weld power. Additionally, the over temperature indicator 62 may communicate to an operator that the portable battery powered welder 10 has surpassed a desired temperature level and can not provide the required weld power. Finally, the external control panel 38 is not limited to the controls and indicators illustrated and may include a wire speed control, a purge switch, trigger hold switch, a digital meter, a polarity switch, and so forth.

Figure 4:
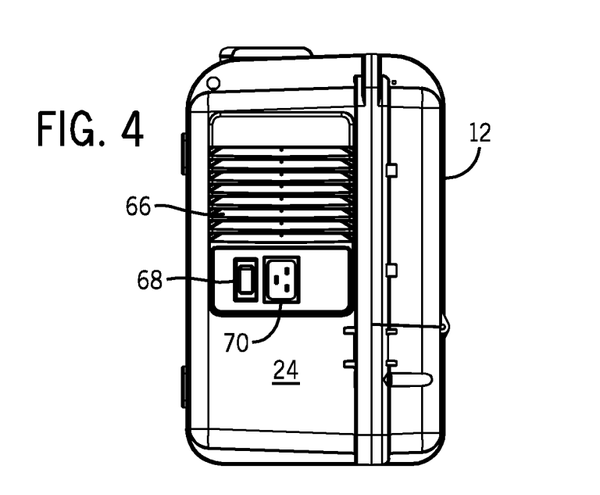
FIG. 4 is a left side elevational view of an embodiment of the portable battery powered welder of FIG. 2, viewed along line 4-4, illustrating a rear louver, a power switch, and an electrical plug interface.

FIG. 4 is a left side elevational view of the portable battery powered welder of FIG. 2, viewed along line 4-4. The figure illustrates a rear louver 66, a power switch 68, and an external power interface 70 that may be located on the left side 24 of the battery powered welder 10. The rear louver 66 forms part of the cooling system. The power switch 68 may include a rocker style switch that enables an operator to power off the welder to conserve battery power. The power interface 70 may be configured to couple to a detachable cord that connects to an external power source. This enables an operator to charge a battery enclosed in the case 12 via connecting cord between the power interface 70 and an external power source. Finally, the left side 24 of the battery powered welder 10 is not limited to these features and may include a gas port and/or other features.

Figure 5:
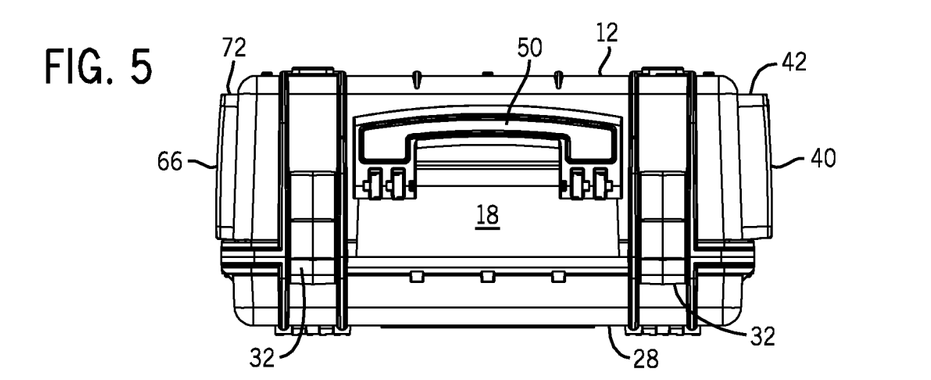
FIG. 5 is a top elevational view of an embodiment of the portable battery powered welder of FIG. 2, viewed along line 5-5, illustrating a handle and a latch coupled to the lateral access door.

FIG. 5 is a top elevational view of the portable battery powered welder of FIG. 2, viewed along line 5-5. The figure illustrates the handle 50 and latches 32 that are coupled to the hinged lateral access door 28. Further, the figure illustrates that the rear louver 66, power switch 68, and power interface 70 are generally flush with the exterior of the suitcase 12 and are further protected by structural rib 72. In other words, structural rib 72 provides a protective recess for power switch 68 and power interface 70.

Figure 6:
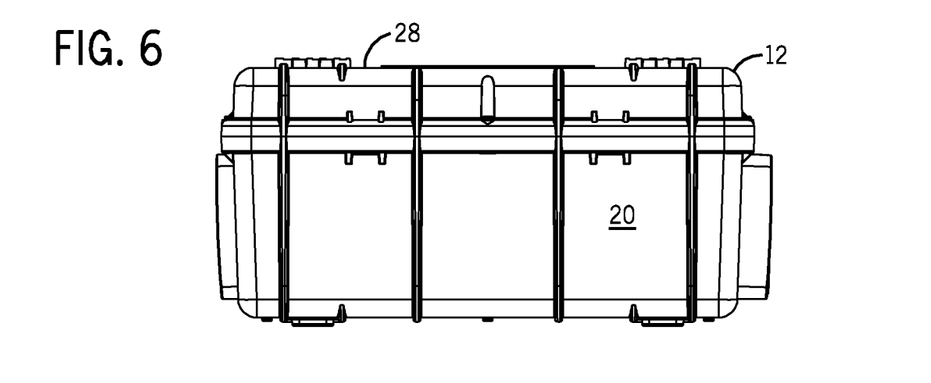
FIG. 6 is a bottom elevational view of an embodiment of the portable battery powered welder of FIG. 2, viewed along line 6-6.

FIG. 6 is a bottom elevational view of the portable battery powered welder of FIG. 2, viewed along line 6-6. Again, FIGS. 1-6 generally illustrate that all of the welding and system components of the portable battery powered welder 10 are either generally flush with the suitcase 12 and/or completely enclosed within the suitcase 12. In other words, the suitcase 12 provides a portable enclosure that supports the components and completely surrounds the components disposed therein. As will be discussed in more detail below, the components disposed within the case may include a welding circuit, a power conversion circuit, a battery charging circuit, a wire feeder, a wire spool, one or more batteries, shock absorbent material (e.g., foam interior lining), a cooling system (e.g., fans, heat sinks, heat pipes, ducts, etc.), and so forth.

Figure 7:
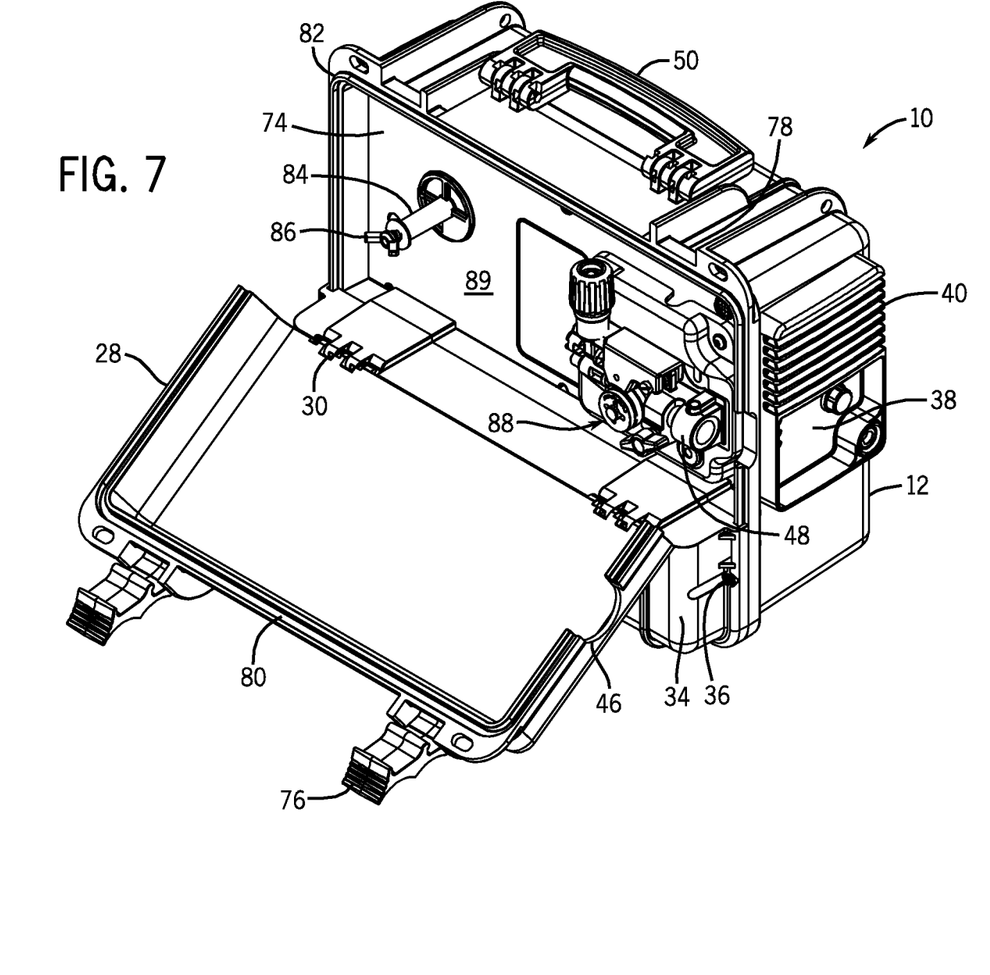
FIG. 7 is a perspective view of an embodiment of the portable battery powered welder of FIG. 1, illustrating a lateral access door rotated away from the body to an open position to reveal a first internal compartment that includes a wire spool mount and a wire feeder.

FIG. 7 is a perspective view of an embodiment of the portable battery powered welder 10. The figure illustrates the lateral access door 28 rotated away from the body of the case 12 to an open position revealing a first internal compartment 74. The lateral access door 28 may be rotated to the illustrated position by disengaging a pair of latches 76, located on the door 28, from the mating latch shoulders 78, located on the body of the case 12. Furthermore, lateral access door 28 may include a groove 80 extending around the perimeter of the door 28 that is configured to engage a mating protrusion 82 located on the body of the case 12. The mating of groove 80 with protrusion 82 provides an orientation and sealing feature of the lateral access door 28 to the body of the case 12. This interface may include a rubber seal to provide a generally hermitic environment and general barrier that excludes dirt and debris from the internal compartment 74 of the suitcase 12.

The internal compartment 74 includes a wire spool mount 84, wire spool nut 86, and a wire feeder 88 positioned on an internal wall 89 of the suitcase 12. A wire spool may be mounted on the wire spool mount 84 and secured to the spool mount 84 via the spool nut 86. The wire spool mount 84 may be an integral part of the internal wall 89 that is formed during the molding process of the wall. In certain embodiments, the molded wire spool mount 84 may include a component that is entirely plastic and/or may include other components, such as metal hubs, threaded inserts, or sleeves. Alternatively, the wire spool mount 84 may include a separate metal and/or plastic piece that is secured to the internal wall 89 via an attachment mechanism (e.g., screw threads). Wire from the wire spool may then be fed to the wire feeder 88 which supplies the wire to a welding gun via the welding gun connection point 48. The wire is then fed through the welding gun and out through the case via welding wire outlet 46. Again, embodiments of the system 10 completely enclose the components within the suitcase 12 and/or position the components generally flush with the suitcase 12, thereby limiting exposure of the components to accidental damage. Specifically, as illustrated in FIG. 7, the suitcase 12 acts as a barrier and provides protection and structural support to the wire feeder 88 and wire spool.

Figure 8:
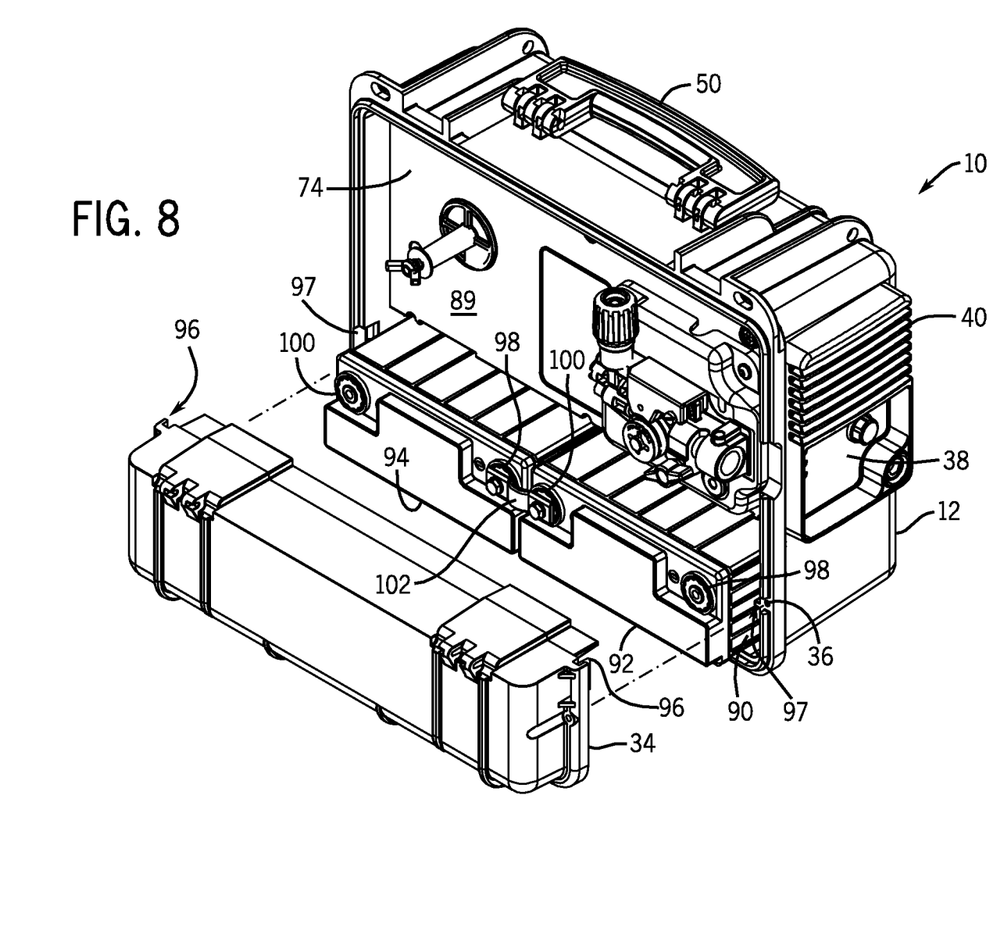
FIG. 8 is a perspective view of an embodiment of the portable battery powered welder of FIGS. 1 and 7 with the lateral access door removed and not shown for clarity, further illustrating the access panel removed from the body to reveal a second internal compartment that includes a battery storage region having a first battery and a second battery.

FIG. 8 is a perspective view of an embodiment of the portable battery powered welder 10 where the lateral access door 28 (See FIG. 7) is not shown for clarity. The figure also illustrates access panel 34 removed from the body of the case 12 to reveal a second internal compartment 90. The internal compartment 90 includes a battery storage region having a first battery 92 and a second battery 94 disposed therein. The batteries 92, 94 may include two 12 Volt, sealed, lead acid batteries or any other type of suitable battery. The batteries include a positive terminal 98 and a negative terminal 100. In certain embodiments, the batteries are connected in series via a coupling bracket 102 that extends from the negative terminal 100 of the first battery 92 to the positive terminal 98 of the second battery 94 to provide a potential 24 Volts that may be used for the welding operation. However, embodiments of the welding system 10 are not limited to this configuration, or even to two batteries. Therefore, embodiments of the welding system 10 may include a single battery, or three or more batteries connected in series, parallel, or a combination thereof.

FIG. 8 also illustrates both the snap-mounting features 96, 97 and the fastening features 36 that may be included on access panel 34 to secure the panel 34 to the body of the suitcase 12. This configuration is advantageous because it facilitates access to the batteries for maintenance and repair. Moreover, the snap-mounting features 96, 97 (e.g., snap-fit latches) simplify the installation and removal of the panel 34 by partially eliminating the use of a tool (e.g., tool-free installation). In some embodiments, the fastening features 36 may incorporate the use of thumb-screws, snap-fit latches, or other tool-free fasteners to further simplify the mounting and removal of the panel 34.

Figure 9:
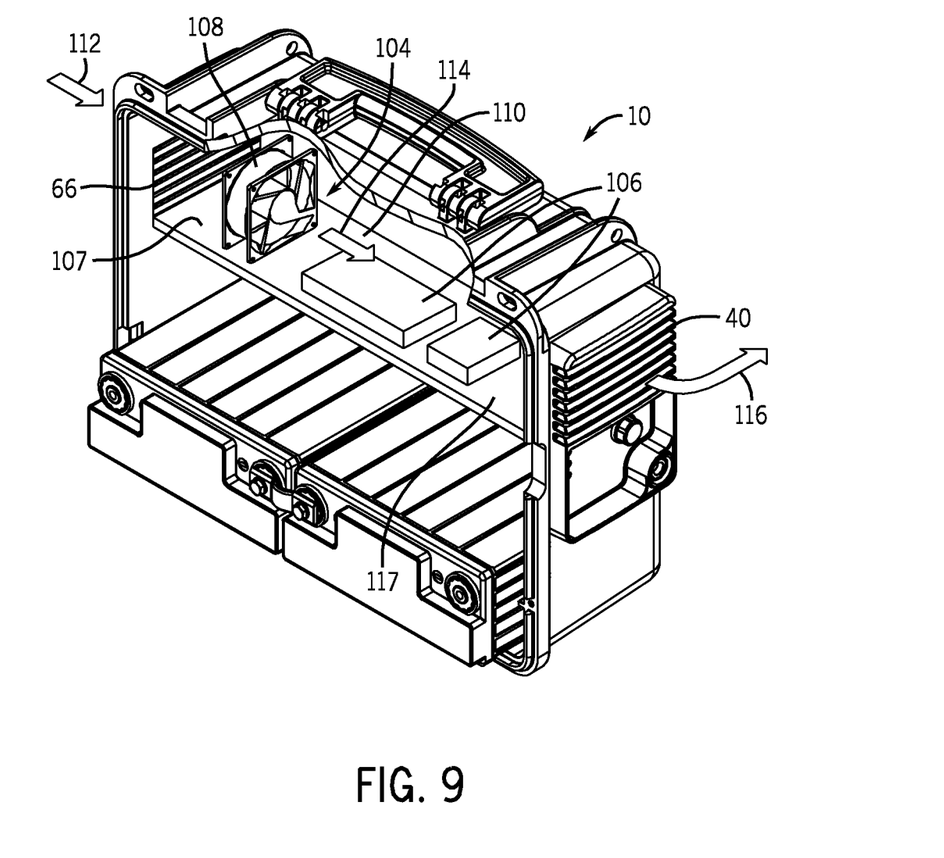
FIG. 9 is a perspective view of an embodiment of the portable battery powered welder of FIG. 8, with the access panel removed and not shown for clarity, further illustrating a cooling system and a welding circuit disposed in a third internal compartment.

FIG. 9 is a perspective view of an embodiment of the portable battery powered welder 10 where both the lateral access door 28 (See FIG. 7) and access panel 34 (See FIG. 8) are not shown for clarity. Additionally, the internal wall 89 (See FIGS. 7 and 8) has also been removed to reveal a cooling system 104 and a welding circuit 106 disposed in an internal compartment 107 of the suitcase 12. The cooling system generally includes a cooling fan 108 that is configured to pass a forced airflow through a wind tunnel 110 and over the welding circuit 106. The force airflow path includes air entering through the rear louver 66, generally represented by reference numeral 112, through the fan 108 and over the weld circuit 106, generally represented by reference numeral 114, and out through the front louver 40, generally represented by reference numeral 116. The forced airflow generally acts to dissipate heat or cool the weld circuit 106 via convection cooling. In certain embodiment, the cooling system 104 may further include one or more heat sinks, heat pipes, liquid cooling radiators, liquid pumps, additional fans in series or in parallel, or a combination thereof.

FIG. 9 further illustrates that the weld circuit 106 is supported by an internal wall 117. However, embodiments of the welding system 10 are not limited to this configuration and the weld circuit may be positioned on the external walls of the suitcase 12 or supported by multiple internal walls. Moreover, the weld circuit 106 may include multiple circuit boards that may be positioned in multiple locations with respect to the cooling system 104. Again, embodiments provide that the components are disposed and completely enclosed within the suitcase 12 and/or are generally flush with the suitcase 12. Specifically, the suitcase 12 acts as a barrier (e.g., substantially keeps out moisture, rain, mud, or other debris) and provides protection and structural support to the cooling system 104 and weld circuit 106 illustrated in FIG. 9.

Figure 10:
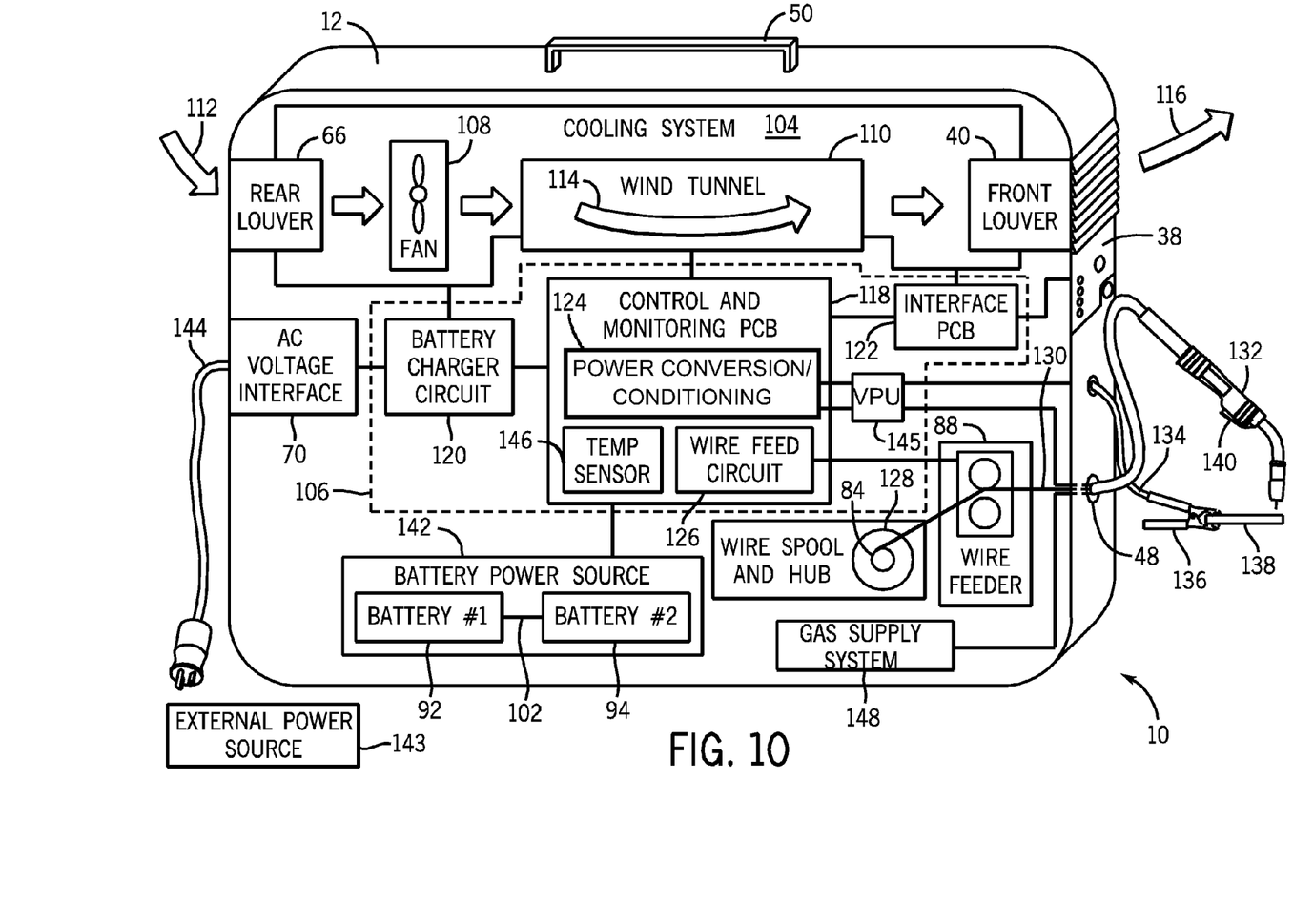
FIG. 10 is a diagrammatical representation of an embodiment of a portable battery powered welder, illustrating a number of individual components that may be completely enclosed and supported by the suitcase.

FIG. 10 is a diagrammatical representation of a portable battery powered welder 10 in accordance with embodiments of the invention. The figure illustrates a plurality of welding or system components that may be completely enclosed and supported by the suitcase 12. As discussed above, weld circuit 106 may include a number of circuits. For example, weld circuit 106 may include a control and monitoring circuit 118, a battery charger circuit 120, and an interface circuit 122. The control and monitoring circuit 118 may include a power conversion and/or conditioning circuit 124 and a wire feed circuit 126.

Additionally, the portable battery powered welder 10 may include a wire spool 128 that includes a consumable welding wire 130. The consumable welding wire 130 is supplied to a weld gun 132 via the wire feeder 88. A work cable 134 and work clamp 136 may be coupled to the portable battery powered welder 10 and a work piece 138. A welding operation may then be initiated by activating trigger 140 on the welding gun 132 to complete an electrical circuit between the work piece 138 and the portable battery powered welder 10. In addition to a battery power source 142, the welder 10 may be powered by an external power source 143. The external power source 143 may be any independent source and may include 115 VAC source or even another battery power source (e.g., an automobile battery). Additionally, the external power source 143 may be used to recharge the battery power source 142.

The external power source 143 may be engaged via a cord 144 that may be detached from the suitcase 12 to facilitate transport and storage of the welder 10. The cord 144 may include a three conductor configuration for engaging standard electrical outlets or may include a two conductor configuration for engaging power outlets provided in motor vehicles. Similarly, the welding gun 132, work cable 134, and work clamp 136 are also detachable from the suitcase 12 to facilitate transport and storage of the welder 10. Finally, a gas supply system 148 may be included in the suitcase 12 to be used with certain welding operations. For example, the gas supply system 148 may provide the inert gas required for a MIG welding operation. The gas supply system 148 may include a gas cylinder, gas valve, flow meter, regulator, associated plumbing, etc.

As discussed above, the portable battery powered welder 10 includes a weld circuit 106 that further includes specific circuits. In general, the control and monitoring circuit 118 may include hardware and software used to control the power conversion circuit 124, the battery charger circuit 120, and wire feeder circuit 126. For example, the control and monitoring circuit 118 may control the battery charge circuit 120 by providing a battery recharge algorithm based on battery voltage, current, time of charge, temperature of battery, etc. Likewise, the battery charge circuit 120 may be configured to convert AC line power (e.g., 115 VAC) to the proper voltage and current levels to recharge the battery power source 142. Additionally, the battery charge circuit 120 may also supply power to the power conversion circuit 124 when the portable battery powered welder 10 is electrically coupled to an external power source 143.

The control and monitoring circuit 118 may also control the welding output power to provide the proper output voltage and current via the power conversion circuit 124. The power conversion circuit 124 may be configured to condition and convert power provided by the battery power source 142 and/or the external power source 143. In other words, the power conversion circuit provides the proper regulated output weld voltage and current levels suitable for the weld process and control settings. Additionally, the power conversion circuit 124 may be coupled to a voltage polarity unit 145 that can switch the positive and negative voltage potential between the welding wire 130 and work cable 134.

The control and monitoring circuit 118 may also include a number of monitoring circuits to protect the portable battery welder 10 and its internal components from over-temperature or thermal overload. For example, temperature sensor 146 may monitor the temperature of the system or welding components (e.g., power devices, a battery, the enclosure ambient temperature, etc.). The measured temperature of the respective component may then be used by the control and monitoring circuit 118 to prevent thermal overload of the welder 10. For example, the control and monitoring circuit may activate the fan 108 located in the cooling system 104 to dissipate heat from a power component of the weld circuit 106. Alternatively, the control and monitoring circuit 118 may automatically shut down the welder 10 if the duty cycle is exceeded or the air flow required for cooling is restricted. Further, the control and monitoring circuit 118 may also protect the battery from over discharge that may result in low battery shutdown. Finally, the control and monitoring circuit 124 may control the wire feed circuit 126 and interface circuit 122. The wire feed circuit 126 provides power and control signals to drive the wire feeder 88. The interface circuit 122 controls the indicators located on the external control panel 38.

In sum, one of the advantages of the disclosed embodiments is that the components of the portable battery powered welder 10 are completely enclosed within the suitcase 12 and/or are generally flush with an exterior of the suitcase 12. In other words, the components are protected by the enclosure and/or the structural ribs 26 of the suitcase 12 and do not protrude outside of the suitcase 12. Specifically, the welding circuit 106, the wire feeder 88, the wire spool 128, the battery power supply 142, and the cooling system 104 may be disposed in the suitcase 12 and protected by the shell of the case 12. Also, with the exception of the cooling system 104, the suitcase 12 may be substantially sealed from the environment. Furthermore, the louvers 40 and 66 may be oriented with downward angled horizontal slats, such that rain cannot enter the suitcase 12.

Figure 11:
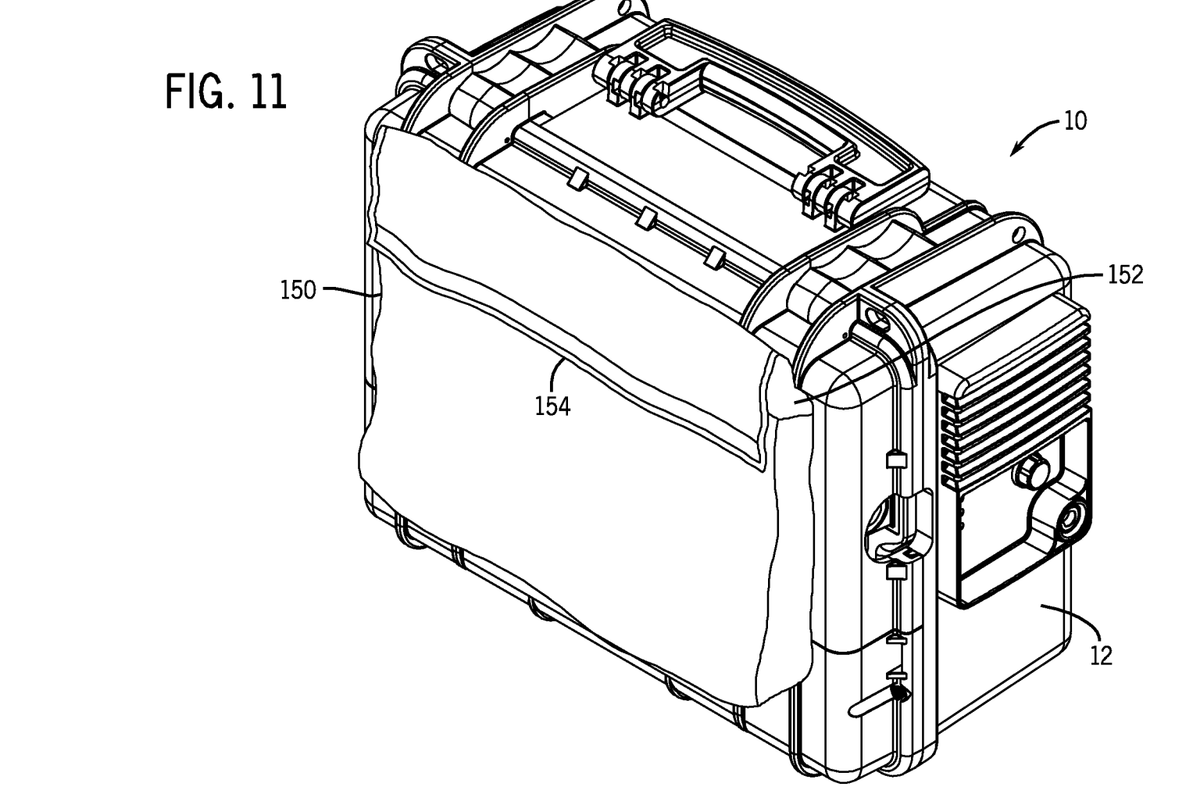
FIG. 11 is a perspective view of an embodiment of a portable battery powered welder, illustrating an accessory bag coupled to an external surface of the suitcase.

Further, FIG. 11 is a perspective view of an embodiment of the portable battery powered welder 10 that includes an accessory bag 150 coupled to the exterior of the suitcase 12. The accessory bag 150 may be attached to either the front side 14 or the back side 16 of the suitcase 12 and may be secured to the suitcase 12 via securing feature 52, 54 (see FIG. 1). The accessory bag 150 may include an internal pocket 152 accessible via flap 154. The accessory bag 150 may be used to store the power cord 144, welding gun 132, work cable 134, work clamp 136, and other welding tools and supplies. Again, the accessory bag 150 and suitcase 12 help to facilitate transport of the portable battery powered welder 10.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A battery powered welder, comprising:
    a battery;
    a welding circuit configured to output a welding power using power from the battery;
    a wire feeder configured to feed a welding wire using power from the battery; and
    a suitcase integrally supporting and completely enclosing the welding circuit, the battery, and the wire feeder, wherein the suitcase comprises:
       a lateral access door comprising a first access panel over a first compartment supporting the wire feeder, and a second access panel over a second compartment supporting the battery, the first and second access panels are disposed along a common side of the suitcase, and the first and second access panels are coupled together at a hinge, wherein the hinge is configured to enable the lateral access door to be disengaged and removed from the suitcase, and wherein the lateral access door comprises a groove extending around a perimeter of the lateral access door and configured to engage a mating protrusion of a body of the suitcase; and
       a side panel comprising a first structural rib defining a first protective recess, and an external control panel disposed within the first protective recess, such that one or more input devices disposed on the external control panel are enclosed within the first structural rib.

2. The battery powered welder of claim 1, wherein the first access panel comprises a latch configured to removably secure the first access panel in a closed position relative to the suitcase.

3. The battery powered welder of claim 1, wherein the second access panel comprises a snap-fit configured to removably secure the second access panel to the suitcase.

4. The battery powered welder of claim 1, wherein the suitcase is made of a flame retardant polymer.

5. The battery powered welder of claim 1, wherein the first and second access panels completely cover the common side of the suitcase.

6. The battery powered welder of claim 5, wherein the first access panel is substantially larger than the second access panel.

7. The battery powered welder of claim 1, comprising a power conversion and conditioning circuit and a battery charging circuit disposed in the suitcase and coupled to the battery.

8. The battery powered welder of claim 1, comprising a work clamp and a welding gun coupled to the wire feeder and the welding circuit.

9. The battery powered welder of claim 1, comprising a gas supply system disposed in the suitcase.

10. The battery powered welder of claim 1, comprising a voltage polarity unit configured to switch a positive and negative voltage potential in the battery powered welder, wherein the voltage polarity unit is disposed in the suitcase.

11. The battery powered welder of claim 1, wherein the second compartment is configured to receive the battery.

12. The battery powered welder of claim 11, wherein the second access panel is removable from the body of the suitcase to enable access to the battery.

13. The battery powered welder of claim 11, wherein the second access panel comprises a first set of snap-mounting features configured to engage with a second set of snap mounting features on the body of the suitcase to secure the second access panel to the body of the suitcase.

14. The battery powered welder of claim 1, wherein the external control panel comprises a work clamp connection, a welding wire outlet, a welding gun connection point, a welding output control, or a combination thereof.

15. The battery powered welder of claim 1, wherein the external control panel comprises a ready indicator, a low battery indicator, an over temperature indicator, a battery charge indicator, or a combination thereof.

16. A battery powered welder, comprising:
    a battery;
    a circuitry comprising a welding circuit and a power conversion circuit, wherein the circuitry is coupled to the battery, and the circuitry is configured to output a welding power using power from the battery;
    a wire feeder configured to feed a welding wire using power from the battery; and
    a suitcase supporting the circuitry, the wire feeder, and the battery, wherein the suitcase comprises:
       at least one compartment supporting the wire feeder and the battery;
       at least one access panel configured to open and close at least one opening into the at least one compartment, wherein the at least one compartment comprises a first compartment and a second compartment, the at least one access panel comprises a first access panel disposed over the first compartment and a second access panel disposed over the second compartment, the second access panel comprising a hinge and a first set of snap-mounting features that engage with a second set of snap mounting features on a body of the suitcase to removably couple the second access panel to the body of the suitcase, wherein the wire feeder is disposed in the first compartment, and the battery is disposed in the second compartment, wherein the first and second access panels are disposed on a common side of the suitcase, wherein the first access panel is coupled to the second access panel at the hinge; and
    a side panel having a first structural rib defining a first protective recess, wherein a power switch and a power interface are disposed within the first protective recess, such that the power switch and the power interface are enclosed within the first structural rib.

17. The battery powered welder of claim 16, wherein the wire feeder and a wire spool mount are disposed inside the at least one compartment, and the wire spool mount is configured to support a wire spool inside the at least one compartment.

18. The battery powered welder of claim 16, wherein the circuitry comprises a battery charger circuit configured to recharge the battery.

19. The battery powered welder of claim 16, comprising a gas supply system disposed in the suitcase.

20. The battery powered welder of claim 16, comprising a voltage polarity unit configured to switch a positive and negative voltage potential in the battery powered welder, wherein the voltage polarity unit is disposed in the suitcase.

21. The battery powered welder of claim 16, wherein the first and second access panels substantially cover the common side of the suitcase.

22. The battery powered welder of claim 16, wherein the second access panel is removable from the body of the suitcase to enable access to the battery.

23. The battery powered welder of claim 16, wherein the at least one access panel comprises a groove extending around a perimeter of the at least one access panel configured to engage a mating protrusion of the body of the suitcase.

24. A battery powered welder, comprising:
   a suitcase comprising:
      at least one access panel disposed over at least one compartment, wherein the at least one access panel comprises a groove extending around a perimeter of the at least one access panel and configured to engage a mating protrusion of a body of the suitcase, wherein an interface between the groove and the mating protrusion comprises a seal, wherein the at least one access panel comprises first and second access panels disposed on a common side of the suitcase, the second access panel comprising a hinge and a first set of snap-mounting features that engage with a second set of snap mounting features on the body of the suitcase to removably couple the second access panel to the body of the suitcase, wherein the first and second access panels completely cover the common side of the suitcase, and the first and second access panels are coupled together at the hinge, wherein the hinge is configured to enable the at least one access panel to be disengaged and removed from the suitcase;
      a first side panel having a first structural rib defining a first protective recess, and an external control panel disposed within the first protective recess, such that one or more input devices disposed on the external control panel are enclosed within the first structural rib; and
      a second side panel having a second structural rib defining a second protective recess, wherein a power switch and a power interface are disposed within the second protective recess, such that the power switch and the power interface are enclosed within the second structural rib;
   a battery disposed in the suitcase within the at least one compartment, wherein the battery may be accessed when the second access panel is removed; and
   a welding circuit disposed in the suitcase, wherein the welding circuit is configured to output a welding power using power from the battery;
   wherein the first access panel is disposed over the battery, and the second access panel is disposed over a welding component.

25. The battery powered welder of claim 24, wherein the at least one access panel comprises a tool-free fastener configured to mount the at least one access panel to the suitcase without use of a tool.

26. The battery powered welder of claim 24, wherein the first and second access panels, when coupled to the body of the suitcase, form a seal for the at least one compartment.

* * * * *